(12) United States Patent
Aratani et al.

(10) Patent No.: US 7,287,266 B2
(45) Date of Patent: Oct. 23, 2007

(54) TELEVISION SIGNAL RECEPTION APPARATUS AND METHOD, AND BROADCAST RECEPTION APPARATUS AND METHOD

(75) Inventors: Shuntaro Aratani, Tokyo (JP); Shigeki Mori, Saitama (JP); Keiichi Aoyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/424,416

(22) Filed: Jun. 15, 2006

(65) Prior Publication Data

US 2006/0225122 A1    Oct. 5, 2006

Related U.S. Application Data

(63) Continuation of application No. 09/983,579, filed on Oct. 25, 2001, now Pat. No. 7,124,430.

(30) Foreign Application Priority Data

Oct. 27, 2000    (JP) ............................. 2000-329325

(51) Int. Cl.
*H04N 5/445* (2006.01)
(52) U.S. Cl. ........................................ 725/37; 725/142
(58) Field of Classification Search ................ 725/37, 725/134, 140–142, 152–153; 715/744
See application file for complete search history.

(56) References Cited

U.S. PATENT DOCUMENTS

| 5,752,040 | A | * | 5/1998 | Kaneko et al. ............. 717/170 |
| 5,778,384 | A | * | 7/1998 | Provino et al. ............. 707/200 |
| 5,986,650 | A | * | 11/1999 | Ellis et al. .................... 725/40 |
| 6,177,931 | B1 | | 1/2001 | Alexander et al. ............ 725/52 |
| 6,194,712 | B1 | * | 2/2001 | Suemoto et al. ............ 250/234 |
| 6,481,011 | B1 | * | 11/2002 | Lemmons .................... 725/47 |
| 6,614,470 | B1 | * | 9/2003 | Manowitz et al. ....... 348/211.2 |
| 6,671,454 | B1 | * | 12/2003 | Kaneko et al. ................ 386/83 |
| 2004/0034866 | A1 | * | 2/2004 | Yuen et al. .................... 725/40 |

FOREIGN PATENT DOCUMENTS

| JP | 11-150692 | 6/1999 |
| JP | 2000-83191 | 3/2000 |

* cited by examiner

*Primary Examiner*—Andrew Y. Koenig
*Assistant Examiner*—Sumaiya A. Chowdhury
(74) *Attorney, Agent, or Firm*—Fitzpatrick, Cella, Harper & Scinto

(57) ABSTRACT

It is the objective of the present invention to easily change between an image display application and the viewing of a program for a digital television, and to improve the usability of the television for operating an image display application. The display change list for a (channel) Up/Down key of a remote controller is dynamically altered so that, during the execution of an image display application, an application screen is displayed by using the Up/Down key. Further, when a memory card is loaded immediately after the television is powered on, a display application can be automatically activated. Furthermore, while a user is watching the television, the contents of a memory card is displayed on a small window in one part of the screen, and execution of the image application controlled by the user. In addition, no icons are displayed while an important program is on displaying. Moreover, since the same color and the same arrangement are used for the four function icons as are used for the four color keys on the remote controller, various processes can be performed for the image application.

2 Claims, 17 Drawing Sheets

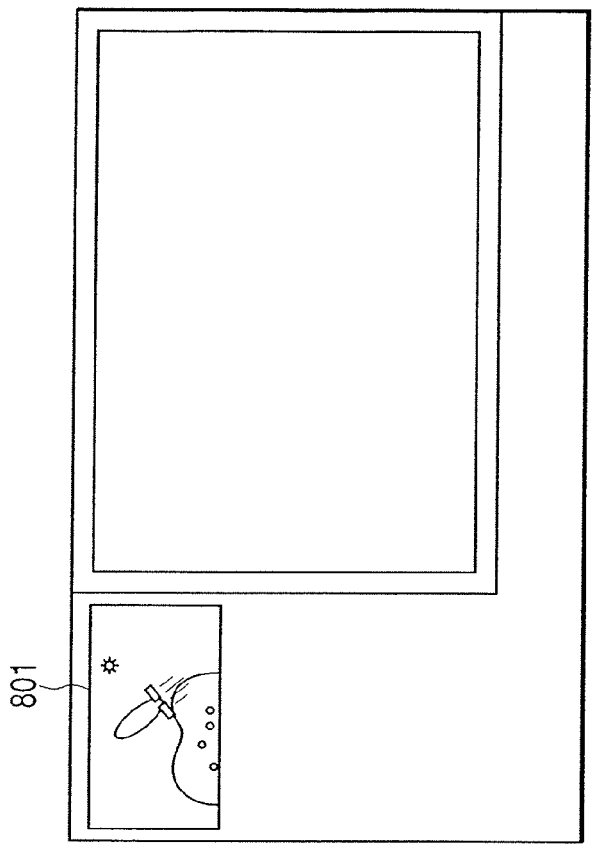
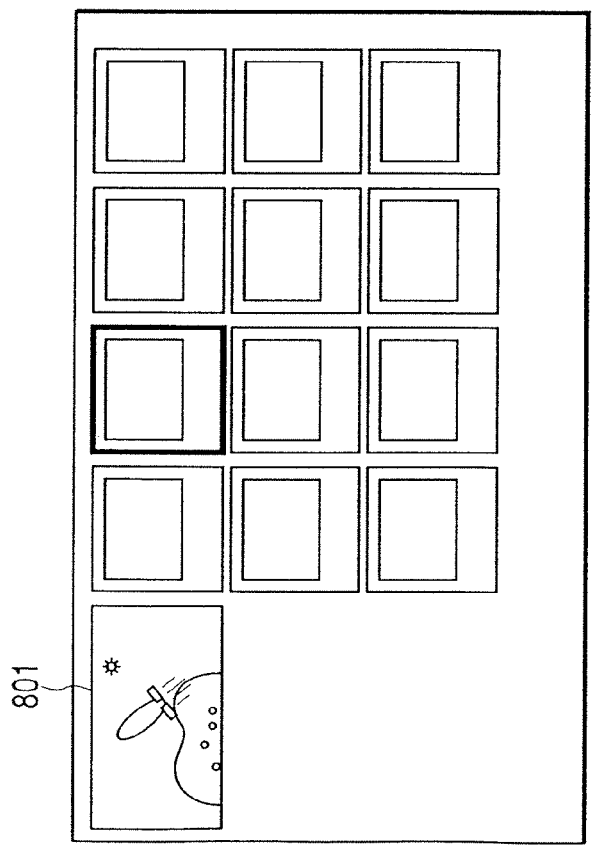

FIG. 10A

| ID | NAME | TIME | RESUME |
|----|------|------|--------|
| 0  | VHF 1 |   | "FullTV (1)" |
| 1  | VHF 3 |   | "FullTV (3)" |
| 3  | VHF 4 |   | "FullTV (4)" |
| ⋮  | ⋮ ⋮  |   |        |
| 11 | BS 5 |   | "FullTV (bs5)" |
| 12 | " "  | 0 | " " |
| 13 | " "  | 0 | " " |
| 14 | " "  | 0 | " " |
| 15 | " "  | 0 | " " |

FIG. 10B

| ID | NAME | TIME | RESUME |
|----|------|------|--------|
| 0  | VHF 1 |   | "FullTV (1)" |
| 1  | VHF 3 |   | "FullTV (3)" |
| 3  | VHF 4 |   | "FullTV (4)" |
| ⋮  | ⋮ ⋮  |   |        |
| 11 | BS 5 |   | "FullTV (bs5)" |
| 12 | "IMAGE VIEWER" | 25 | "Viewer_wakeup" |
| 13 | " " | 0 | " " |
| 14 | " " | 0 | " " |
| 15 | " " | 0 | " " |

FIG. 10C

| ID | NAME | TIME | RESUME |
|----|------|------|--------|
| 0  | VHF 1 |   | "FullTV (1)" |
| 1  | VHF 3 |   | "FullTV (3)" |
| 3  | VHF 4 |   | "FullTV (4)" |
| ⋮  | ⋮ ⋮  |   |        |
| 11 | BS 5 |   | "FullTV (bs5)" |
| 12 | "IMAGE VIEWER" | 0 | "Viewer_wakeup" |
| 13 | "BROWSER" | 0 | "Browser_resume" |
| 14 | " " | 0 | " " |
| 15 | " " | 0 | " " |

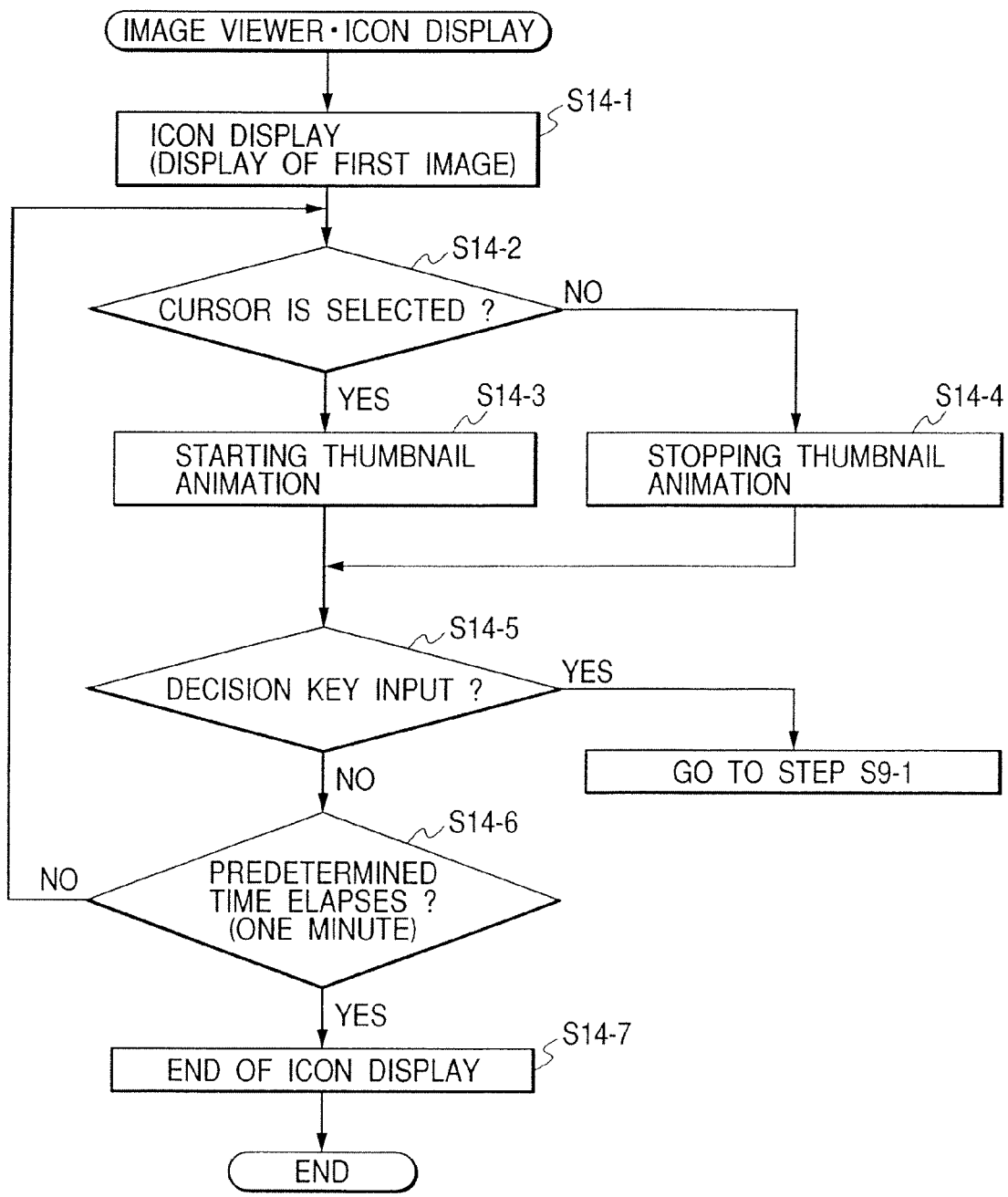

TELEVISION SIGNAL RECEPTION APPARATUS AND METHOD, AND BROADCAST RECEPTION APPARATUS AND METHOD

This application is a continuation of Application No. 09/983,579 filed Oct. 25, 2001 now U.S. Pat. No. 7,124,430.

BACKGROUND OF THE INVENTION

1. Field of the Invention

The present invention relates to a function operation technique for a television signal reception apparatus, and in particular to a function operation technique for a television signal reception apparatus having various functions.

2. Related Background Art

Recently, a broadcast satellite, or communication satellite, system has been put into service that transmits digital television broadcast signals to individual homes. Since this system is capable of providing 100 or more channels, an extensive selection of different types of programs can be provided. Thus, since with this system so many transmittable programs are available, an electric program guide (EPG), which can facilitate the selection of desired programs, is transmitted with other video data and can be displayed on monitoring devices, thereby permitting viewers, by referring to the EPG, to select desired programs.

Because of the development of infra, such as the Internet, the need has gradually increased for a network function that will simplify, for home use, the browsing of the WWW (World Wide Web) and the transmission and reception of e-mail. Further, there is also an increased need for a multimedia function for the display of images obtained using a digital camera. In this respect, a proposal has been made that would facilitate the display on multiple screens of multiple programs and video obtained using an AV machine. For such a television, a demand is also increased that a user be able to select a picture by manipulating a button on a remote controller, or to control a connected apparatus at a remote area.

On the contrary, there are not a few users who do not like to have many remote control buttons on a high-performance television, and there has been an increased demand that means for controlling the multimedia function and the network function be provided without unnecessary increase of the number of operating buttons.

In order to satisfy these needs, improved GUIs (Graphical User Interfaces) have been proposed for television signal reception apparatuses. For example, according to a proposal in Japanese Laid-Open Patent Application Ser. No. 11-150692, a hierarchical menu structure is displayed in two dimensions, thereby enabling users to see and easily understand the complicated hierarchical structure that is used for the menu.

However, according to the technique proposed in Japanese Laid-Open Patent Application No. 11-150692, an electric program guide is provided for which only a comparatively small amount of labor is required to make a category change. But with this arrangement, each time a user desires to employ a function or an application in a completely different category, a menu key, or a key corresponding thereto, must be depressed to move the menu item display through several ranks of the hierarchical structure to change to the screen that displays the desired function. And while understanding the use of this method is easy, especially when the user is one who is not very familiar with the operation of an apparatus, its use soon becomes tediously irksome, since whenever it is actually employed the user must move the cursor hither and thither while concentrating on watching the displayed menu.

Assume, for example, that a user viewing a desired television program was employing an application to browse an image obtained with a digital camera when the program started. Assume further that the user will continue the image browsing during commercial breaks. For this operation, the user, to return each time to the application, must use menu keys to sequentially select functions. To accomplish this there is proposal that provides a "quick jump" key on a remote controller to move to a predetermined function by depressing one key. In many cases, however, to use this key it must be set in advance, and further, this proposal will not be very effective for a television reception apparatus for which the number of functions are expected to be increased.

Further, an additional proposal is conventionally provided for reducing the operating labor required of a user by automatically changing a screen in consonance with an occurring event. In Japanese Laid-Open Patent Application No. 2000-83191, for example, a digital image editing apparatus is disclosed that detects the loading of a memory card and automatically displays an image on a television screen. This proposal is convenient for a single-function apparatus, such as a digital image editing apparatus, because an image can be easily displayed. However, when the same function is provided for a television reception apparatus having multiple functions, it can interfere with the viewing of a program, and an advanced technique is required.

SUMMARY OF THE INVENTION

To resolve the above described shortcomings, one objective of the present invention is to improve a user interface for a television signal reception apparatus having various functions, such as multimedia functions, in addition to a function for the reproduction of a television program, and to select or control desired information for users by employing a simple and easy operation.

To achieve the objective, according to one aspect of the present invention, a television signal reception apparatus comprises:

reception means for receiving a television broadcast;

application execution means for executing a desired application;

display control means for displaying, on display means, an image related to a television signal received by the reception means and an image related to an application executed by the application execution means;

storage means for storing switching information indicating a switching order of images which are displayed by the display means and switched by a predetermined operation input; and control means for controlling the reception means and the display control means in accordance with the switching information so that images received through a plurality of channels of the television broadcast and an image of the application executed by the application execution means are interchangeably displayed in accordance with the predetermined operation input.

The other objectives and features of the present invention will become apparent during the course of a detailed explanation of the present invention given while referring to the accompanying drawings.

BRIEF DESCRIPTION OF THE DRAWINGS

FIGS. 8A and 8B are diagrams showing example thumbnail and example slide screens displayed in the simultaneous display mode of the image viewer application;

FIGS. 10A, 10B and 10C are diagrams showing the contents of an Up/Down list and changes to the list;

FIG. 14 is a flowchart showing the processing performed for the image viewer icon display;

DETAILED DESCRIPTION OF THE PREFERRED EMBODIMENTS

Figure 1:
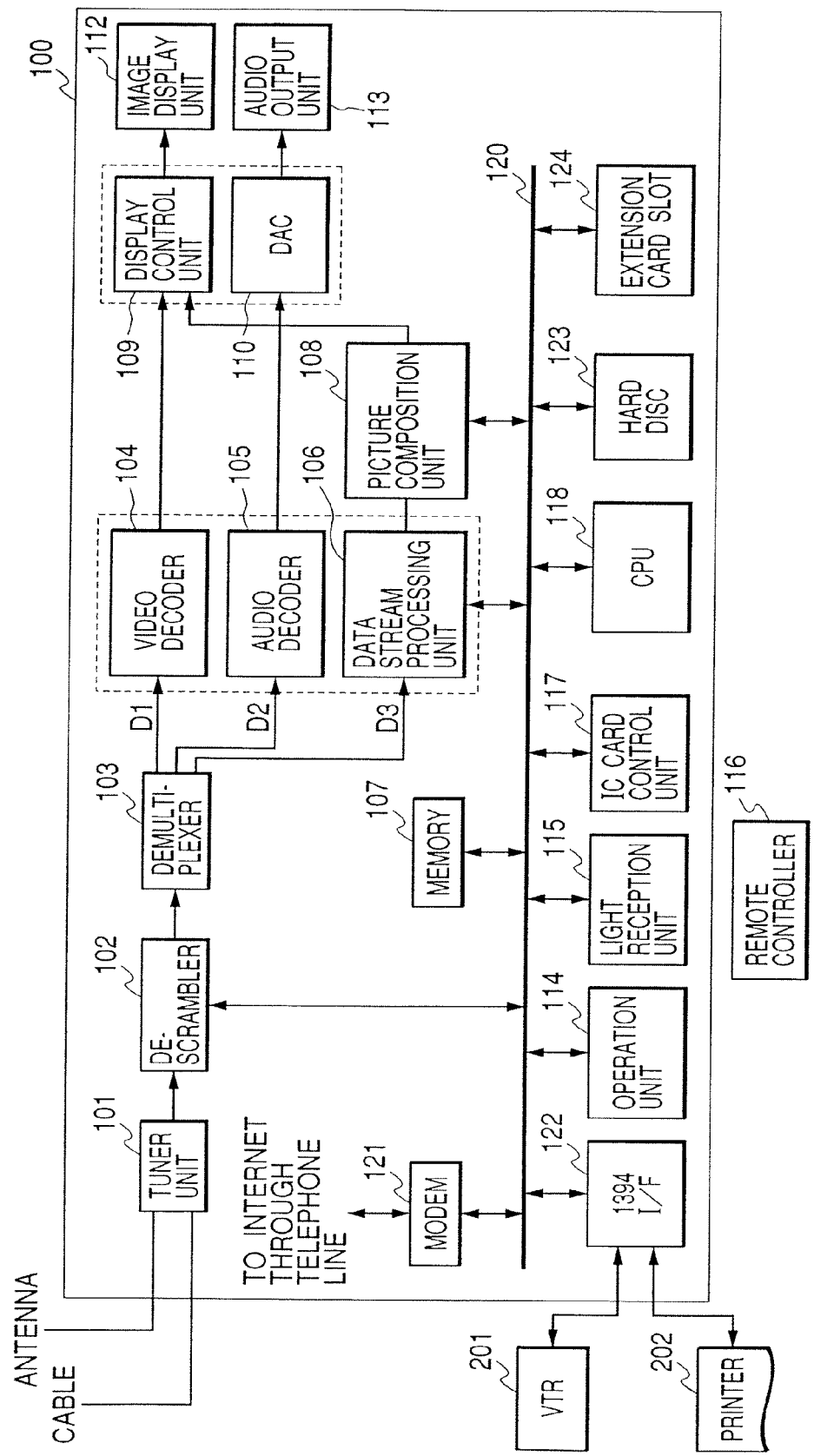
FIG. 1 is a block diagram showing the configuration of a television receiver according to one embodiment of the present invention.

A first embodiment of the present invention will now be described. FIG. 1 is a diagram showing the configuration of a digital television reception apparatus 100 according to the first embodiment.

In FIG. 1, a signal received by an antenna (not shown) is transmitted to a tuner unit 101. The tuner unit 101 performs demodulation, error correction and the like on the received signal, and generates digital data having a form called a transport stream. Further, the generated transport stream (TS) data is output to a descrambler 102.

When the TS data that is scrambled for viewing limitations is received from the tuner unit 101, the descrambler 102 descrambles the TS data based on key information that is included in the TS data for use in the descrambling process, and key information that is output by an IC card control unit 117. The resultant TS data is output to a demultiplexer 103.

The IC card control unit 117 includes an IC card on which contract information is stored for a user, and key information that is used for resolving the key information that is included in TS data used by descrambler. When key information is available for resolving the key information received from the descrambler 102 that is to be used for descrambling, the pertinent key information is output to the descrambler 102.

When TS data that is not scrambled is received from the tuner unit 101, the received TS data is output unchanged to the demultiplexer 103 by the descrambler 102.

From the video and speech multiple channel data, and TS data in which electric program guide (EPG) data, broadcast data and other data are multiplexed in a time sharing manner, that are received from the descrambler 102, the demultiplexer 103 extracts, for a channel selected by an operation unit 114 or a remote controller 116, video data D1 and speech data D2 that are related to a program currently being broadcast, and outputs the respective data D1 and D2 to a video decoder 104 and an audio decoder 105. Further, the demultiplexer 103 extracts data broadcast/EPG data D3 from the TS data, and transmits the data D3 to a data stream processing unit 106. The data stream processing unit 106 processes the data broadcast/EPG data D3, and transmits the resultant data D3 to a memory 107 via a bus 120 that is connected to a CPU 118. The data is then stored on a hard disk 123 after a software processing (described below) by the CPU 118.

The TS data is transmitted as a packet, at the head of which a PID (Packet Identification) is added. The demultiplexer 103 reads the PID to identify the video data D1, the speech data D2 and the data broadcast/EPG data D3.

The video data D1 will be first explained. The video decoder 104 performs MPEG2 decoding on the video data D1 received from the demultiplexer 1203, and outputs the decoded video data to a display control unit 109. The display control unit 109 displays an image on an image display unit 112 by switching screens or multiplexing the data in accordance with the operation of the video decoder 104 or the remote controller 116. A picture composition unit 108 will be described later. The screen display unit 112 includes a monitor and a video signal input terminal (neither of them shown).

The speech data D2 will now be described. The audio decoder 105 performs the MPEG2 decoding process on the speech data D2 received from the demultiplexer 103, and outputs the decoded speech data to a DAC 110. The DAC 110 performs D/A conversion on speech data received from the audio decoder 105, and outputs the resultant data to a speech output unit 113. The speech output unit 113 includes a loudspeaker and a speech signal input terminal (neither of them shown).

The data broadcast/EPG data D3 will now be described. The electric program guide (EPG) data is transmitted with a data structure specified according to standards "program exhibition information used for digital broadcast" by the Association of Radio Industry Board (ARiB). The main data constituents are the SDT (Service Description Table) for transmitting information related to a channel, such as the name of a channel and the name of a broadcasting company, and the EIT (Event Information Table) for transmitting information related to a program, such as the name of a program and the starting broadcast date and time and the program contents explanation.

The screen composition unit 108 outputs a video signal to the display control unit 109 based on data processed by the CPU 118. And the display control unit 109 outputs the video signal to the image display unit 112 in order to switch the video screen and the data broadcast screen or to display synthesized screens, as previously described.

An IEEE1394 interface 122 and a modem 121 are connected to the bus 120, and the IEEE1394 interface 122 is used by the television reception apparatus 100 to perform protocol communication with a VTR 201 and a printer 202, which are externally connected. The AV/C protocol is employed for communication with the VTR 201, and in accordance with this protocol, control commands, such as "play", "stop" and "record", are mainly transmitted from the television reception apparatus 100 to the VTR 201. The SBP (Serial Bus Protocol) 2 is employed for communication with the printer 202, and in accordance with this protocol print data are mainly transmitted from the television reception apparatus 100 to the printer 202. The modem 121 is used for Internet connection via a telephone line.

An extension card slot 124 is used to connect a removable memory card or another recording medium, and in this embodiment, is used to exchange data with a digital camera.

Figure 2:
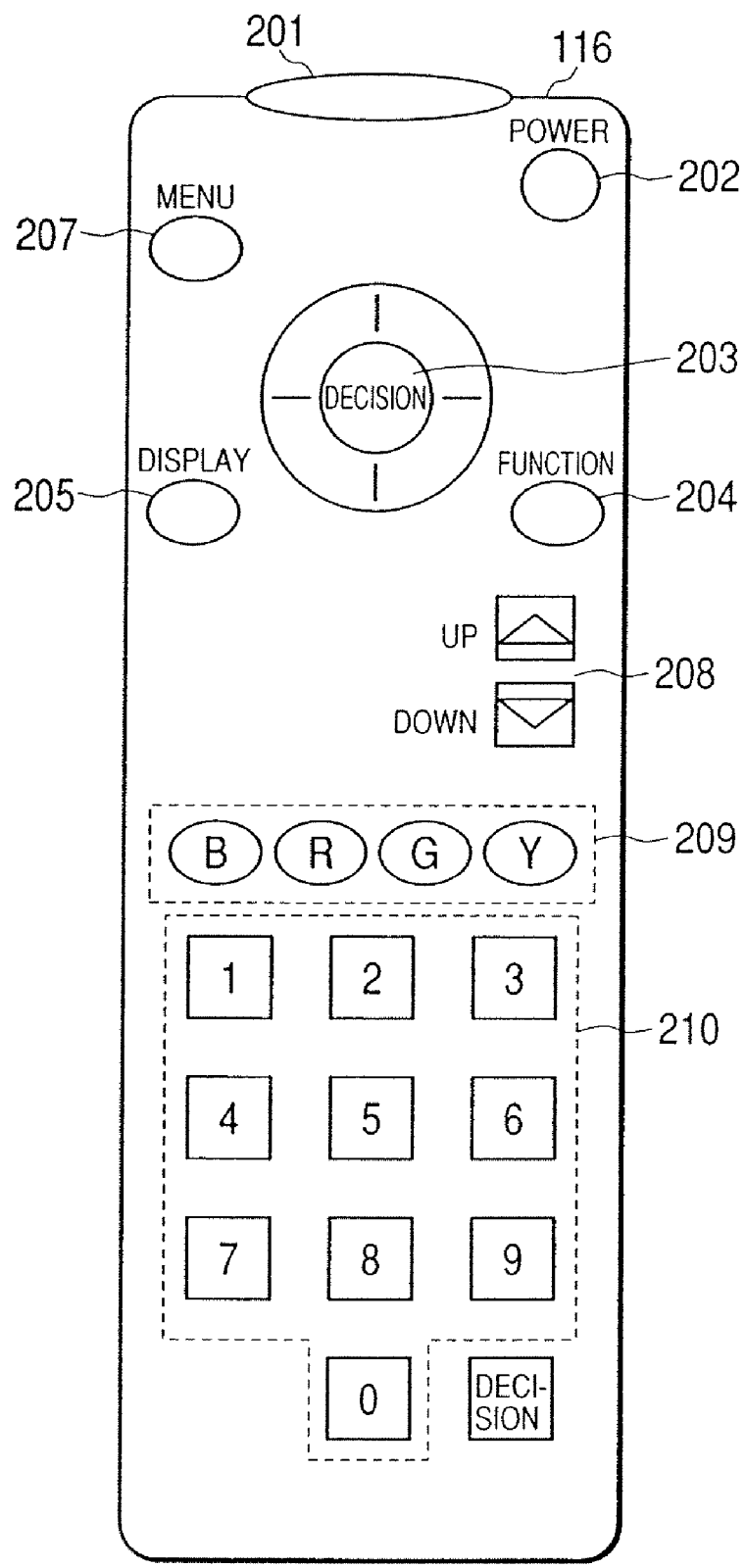
FIG. 2 is a block diagram showing a remote controller for the television receiver according to the embodiment.

The remote controller 116 is shown in FIG. 2. In FIG. 2, only those buttons are shown that are manipulated to carry out functions required for this embodiment; other buttons may be included as needed for the actual reception apparatus.

In FIG. 2, a light-emitting unit 201 is used to perform infrared communication between the remote controller 116 and a light-receiving unit 115 in FIG. 1, and a power key 202 is used to power an apparatus on or off. When a rod-shaped cursor key 203 is tilted forward and backward, to the right and to the left, cursor movement in four directions is entered, and by pushing it down "decide" input can be entered.

The remote controller 116 also includes: a function key 204; a display key 205, for changing a display; numerical keys 206, arranged as a matrix; and a menu button 207, for displaying a menu screen.

An Up/Down key 208 comprises an Up and a Down button. Color keys 209 comprise four color buttons, blue, red, green and yellow, arranged in a row. And a ten key pad 210 is used to enter numbers.

The CPU 118, which includes a program execution device, controls the tuner unit 101, the descrambler 102, the demultiplexer 103, the decoders 104 to 106, the screen composition unit 108, the display control unit 109 and the DAC 110 in accordance with operating commands entered using operation unit 114 including switches, such as a channel selection switch and a power switch, or remote controller 116 keys.

Figure 3:
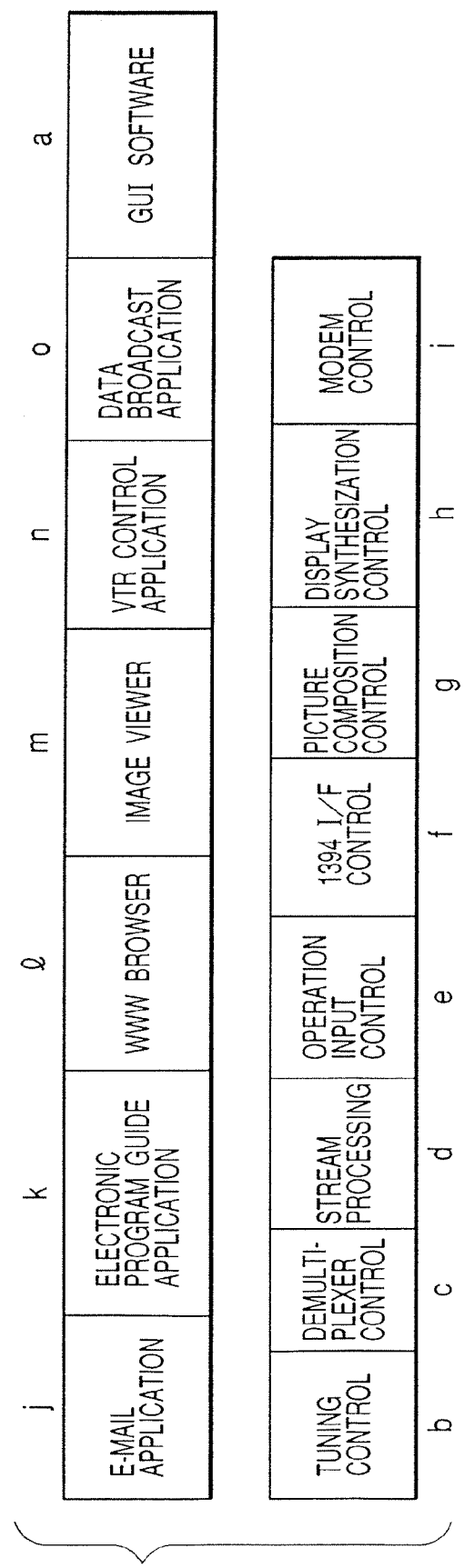
FIG. 3 is a diagram showing the configuration of software operated by a CPU.

FIG. 3 is a diagram showing the structure of the control software operated by the CPU 118. In FIG. 3, control software (b) to (i) constitutes interface software (driver software) that controls the processing units in FIG. 1. The other software, (a) and (j) to (o), is application software executed by the CPU 118.

The e-mail application software (j) controls the modem 121, via the modem control driver (i), and is used to establish a connection with a Internet provider and to exchange e-mail with an e-mail server.

Based on EPG data received through the tuner unit 101, the demultiplexer 103 and the data stream processing unit 106, the electric program guide application (k) displays a list of television programs currently being broadcast to assist a user in selecting a channel, or displays information concerning programs to be broadcast in the future to permit the user to reserve the program.

The WWW browser software (l) is an application for receiving from the Internet, via a modem connection, text and data written in HTML or XML for an information display, such as a homepage.

The data broadcast application (o) is employed for displaying on a screen data that are received by the tuner unit 101, the demultiplexer 103 and the data stream processing unit 106.

The image viewer application (m) is employed for reading image data or moving picture data from a memory card inserted into the extension card slot 124, and for displaying or printing the data.

The VTR control application (n) is an application that controls the display on the operation panel of the VTR 201 that is connected via the IEEE1394 interface 122, and that, when a user moves a cursor to a button displayed on the control panel and depresses the selection key, transmits a corresponding AV/C command, via the IEEE1394 interface 122, for the remote control. The four buttons "play", "stop", "rewind" and "fast forward" are displayed on the control panel, and when the focus, for example, is moved to the play button using a cursor and the decision key is depressed, the AV/C command "play" is transmitted to the VTR 201.

The processing performed by the CPU 118 will now be described in detail.

Figure 4A:
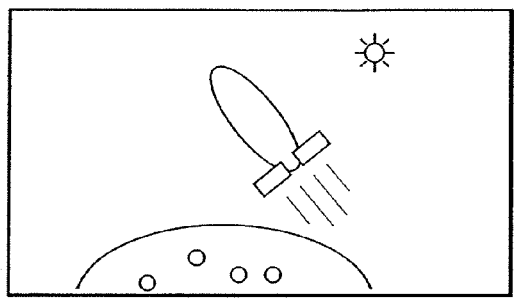
FIGS. 4A, 4B, 4C, 4D and 4E are diagrams showing an example screen displayed during the viewing of television images, an example screen displayed when the menu key of a remote controller is depressed, and an example screen displayed when a user enters an operation while the menu is displayed.
Figure 4B:
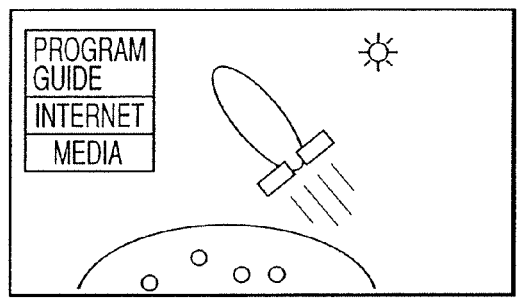

When the digital television reception apparatus 100 of this embodiment is powered on, as is shown in FIG. 4A a television program that is currently being broadcast is displayed across the entire screen, and when a user depresses the menu key 207 on the remote controller 116, the first rank menu entries shown in FIG. 4B are displayed. Three entries, "program guide", "Internet" and "media", are arranged on the screen.

Figure 4C:
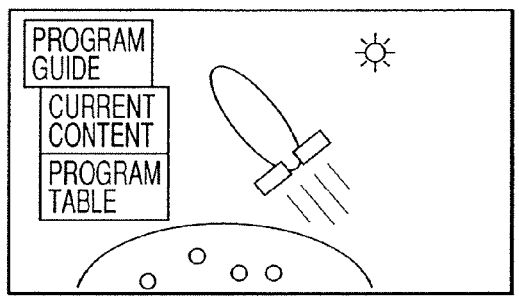
Figure 4D:
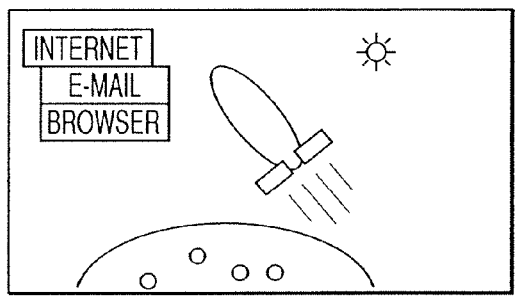
Figure 4E:
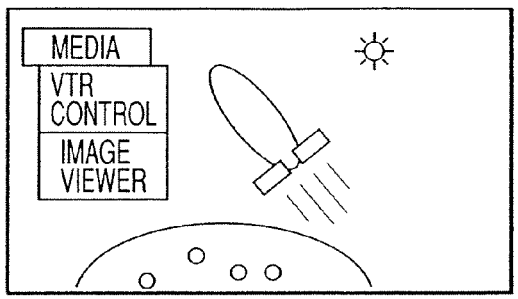

Then, when the user, while in the state in FIG. 4*b*, selects an entry by manipulating the cursor key 203 of the remote controller 116 and depresses the decision key, the second rank menu entries shown in FIGS. 4C to 4E are displayed.

When, for example, the user selects a program guide in FIG. 4B, the menu entries "current content" and "program table (coming programs)" are displayed as is shown in FIG. 4C, and when the user selects the entry "Internet" on the menu in FIG. 4B, as is shown in FIG. 4D, the second rank menu entries "e-mail" and "WWW browser" are displayed.

When "media" is selected on the menu in FIG. 4B, as is shown in FIG. 4E, the second rank menu entries "VTR control" and "image viewer" are displayed.

Further, when the user selects a displayed entry by moving the cursor and depressing the decision key, a selected function is initiated, or the display is changed to the screen for the selected application.

When the user does not manipulate the cursor key immediately after one of the menus in FIGS. 4C to 4E are displayed, but instead depresses the decision key, the menu in FIG. 4B is displayed again.

The operation performed by the image viewer application will now be described while referring to the flowchart in FIG. 5.

Figure 5:
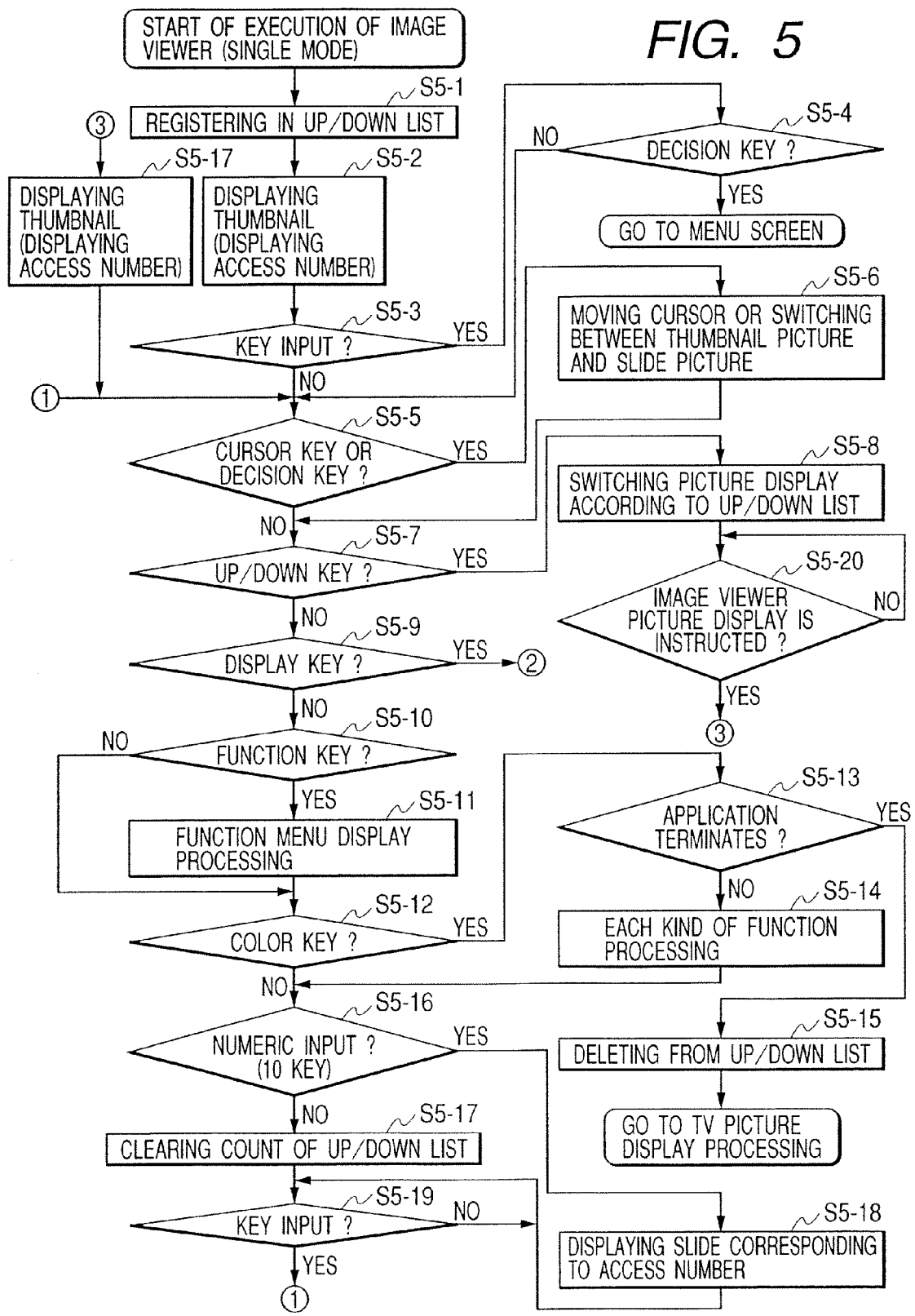
FIG. 5 is a flowchart for the processing performed in a single mode of an image viewer application.
Figure 6B:
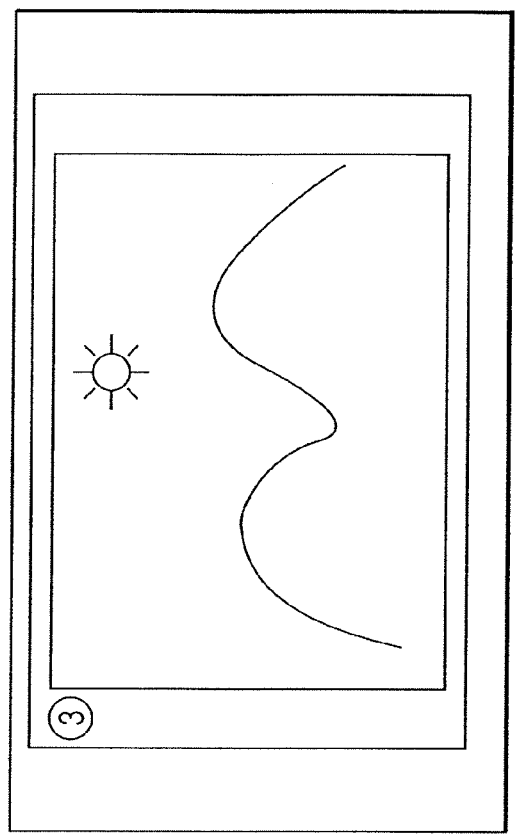
FIGS. 6A and 6B are diagrams showing a thumbnail screen and a slide screen displayed in the single mode of the image viewer application.
Figure 6A:
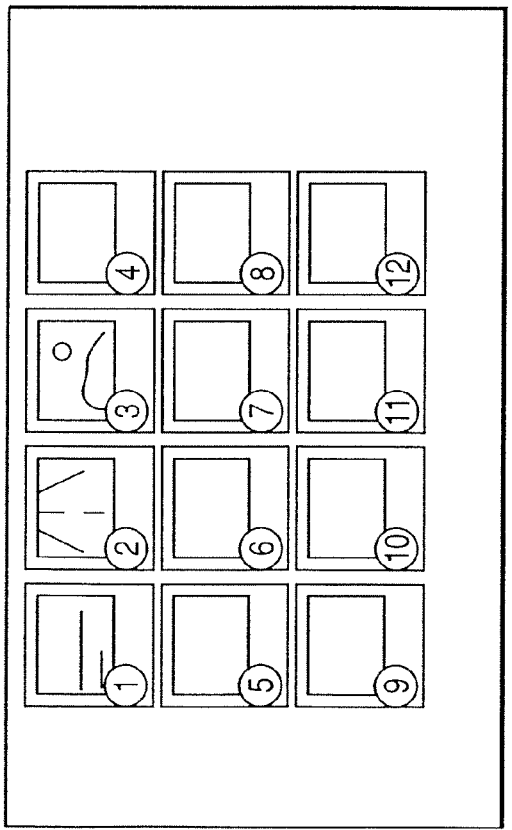

In FIG. 5, the processing is initiated when the image viewer application m is selected using the menu. While watching the television, a user depresses the menu key 207 to display the menu in FIG. 4B and uses the cursor key 203 to selects the entries "media" and "image viewer", so that the use of the image viewer application (single mode) is initiated. First, the registration for the Up/Down list, which will be described later, is performed (S5-1), and the application start screen (the thumbnail screen) shown in FIG. 6A is displayed (S5-2). On the image viewer application start screen, multiple image data sets are read from the memory card, and are displayed as a matrix. When, while in this state, the user again depresses the decision key, i.e., before another key, such as the cursor key 203, is depressed, the screen is returned to the menu screen in FIG. 4E (S5-4).

When, while in the state in FIG. 6A, the user moves the cursor to one of the images displayed in the matrix, that image is highlighted, and can be selected by using the cursor key 203. At this time, upon the depression of the decision key, the display of the selected image is enlarged, as is shown in FIG. 6B (slide display screen) (S5-5 and S5-6). In this state, when the user again depresses the decision key, the screen is returned to the screen in FIG. 6A (S5-6).

The processing performed when the Up/Down key is manipulated in this state will be described later (S5-7 and S5-8).

Further, when, which in the state in FIG. 6A or 6B, the user depresses the display key 205 on the remote controller 116, as is shown in FIGS. 8A and 8B, the simultaneous display mode is set, and both the television screen and the image viewer application screen are displayed (S5-9). In this case, a television screen 801 is shown in FIG. 8A and 8B. The application processing performed during the simultaneous display mode will be described later while referring to FIG. 9.

Operation Associated with Function Key

Figure 7A:
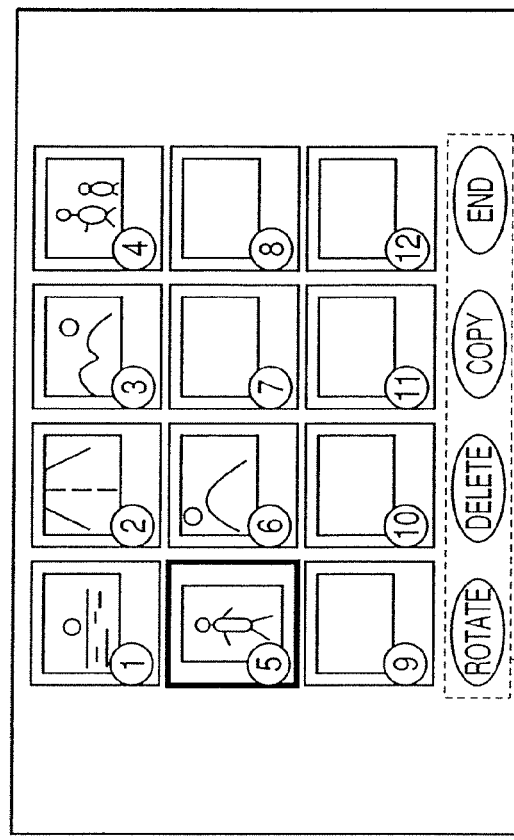
FIGS. 7A and 7B are diagrams examples of screens whereon function menus are displayed while the thumbnail and the slide screens of the image viewer application are displayed.
Figure 7B:
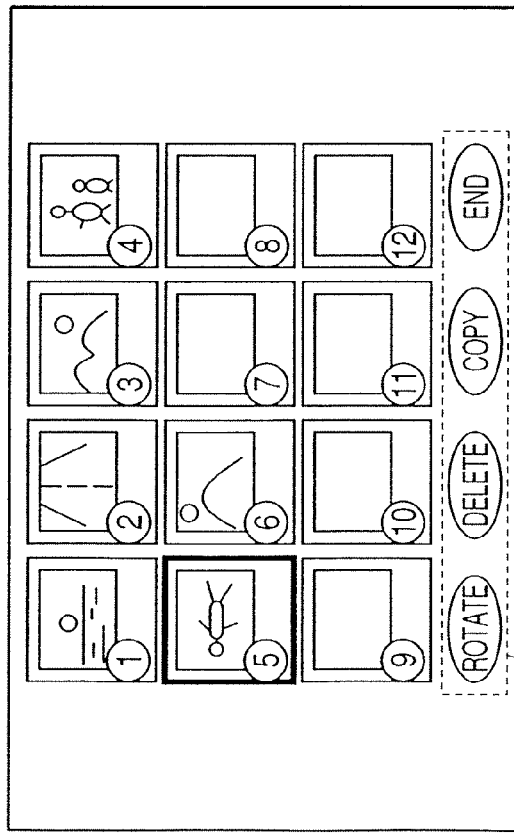

When, while in the state in FIG. 6A, the user depresses the function key 204 on the remote controller 116 (S5-10), a function menu 701 in FIG. 7A is displayed (S5-11). The function menu 701 includes icons for four colors, blue, red, green and yellow, that are arranged from left to right in consonance with the arrangement of the color keys 209 on the remote controller 116. Functional contents are delineated using the icons, on which the function entries "rotate", "delete", "copy" and "end", which are used for the thumbnail screen, are displayed. When the user depresses a color button for a desired function, a corresponding process is performed (S5-14). FIG. 7B is a diagram showing an example display obtained when the user depresses the blue key (image rotation function) in FIG. 7A. FIGS. 7A and 7B show that the selected image (5) has been rotated.

When the user selects "end" (the yellow key in FIGS. 7A and 7B) in the functional menu on the display (S5-13), deletion from the Up/Down list is performed (S5-13), and the image viewer application is terminated.

Figure 16:
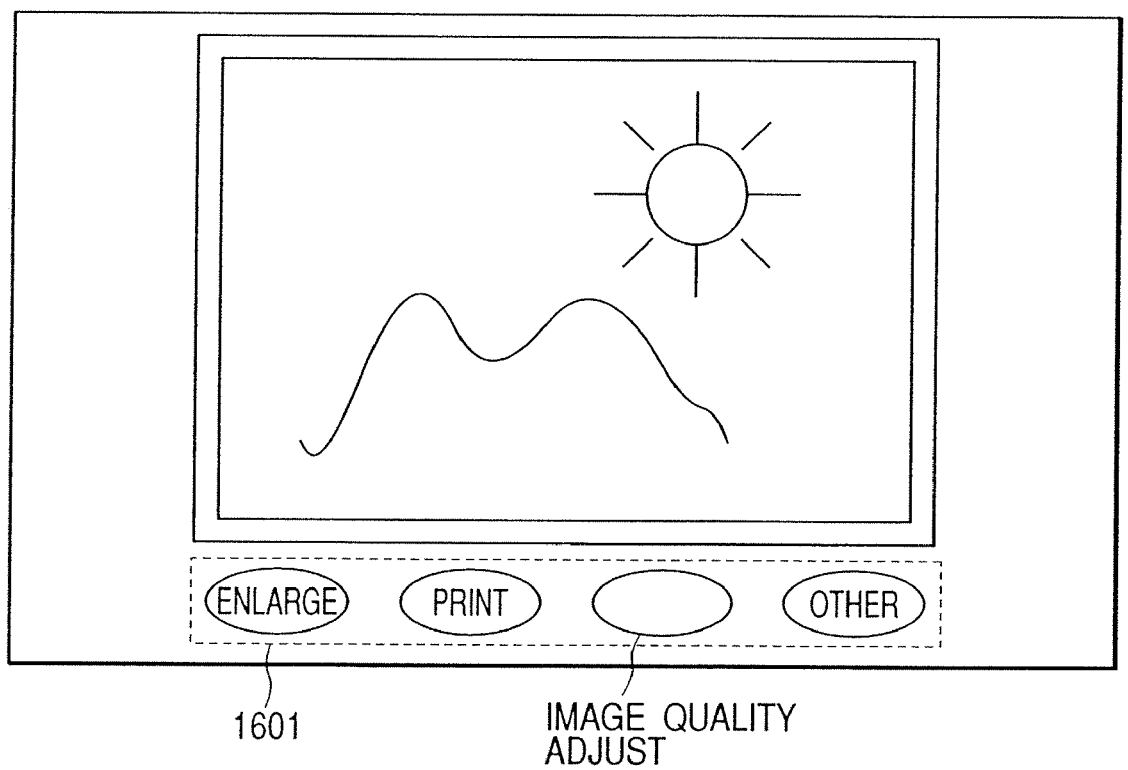
FIG. 16 is a diagram showing the contents of a function menu displayed on the slide screen in the single mode of the image viewer application.

When, while in the state in FIG. 6B, the user depresses the function key 204 on the remote controller 116, the function menu 1601 shown in FIG. 16 is displayed. The functional entries "enlarge", "print", "image quality adjust" and "other", which are used for a slide screen, are displayed on the icons for the functional menu.

Figure 17:
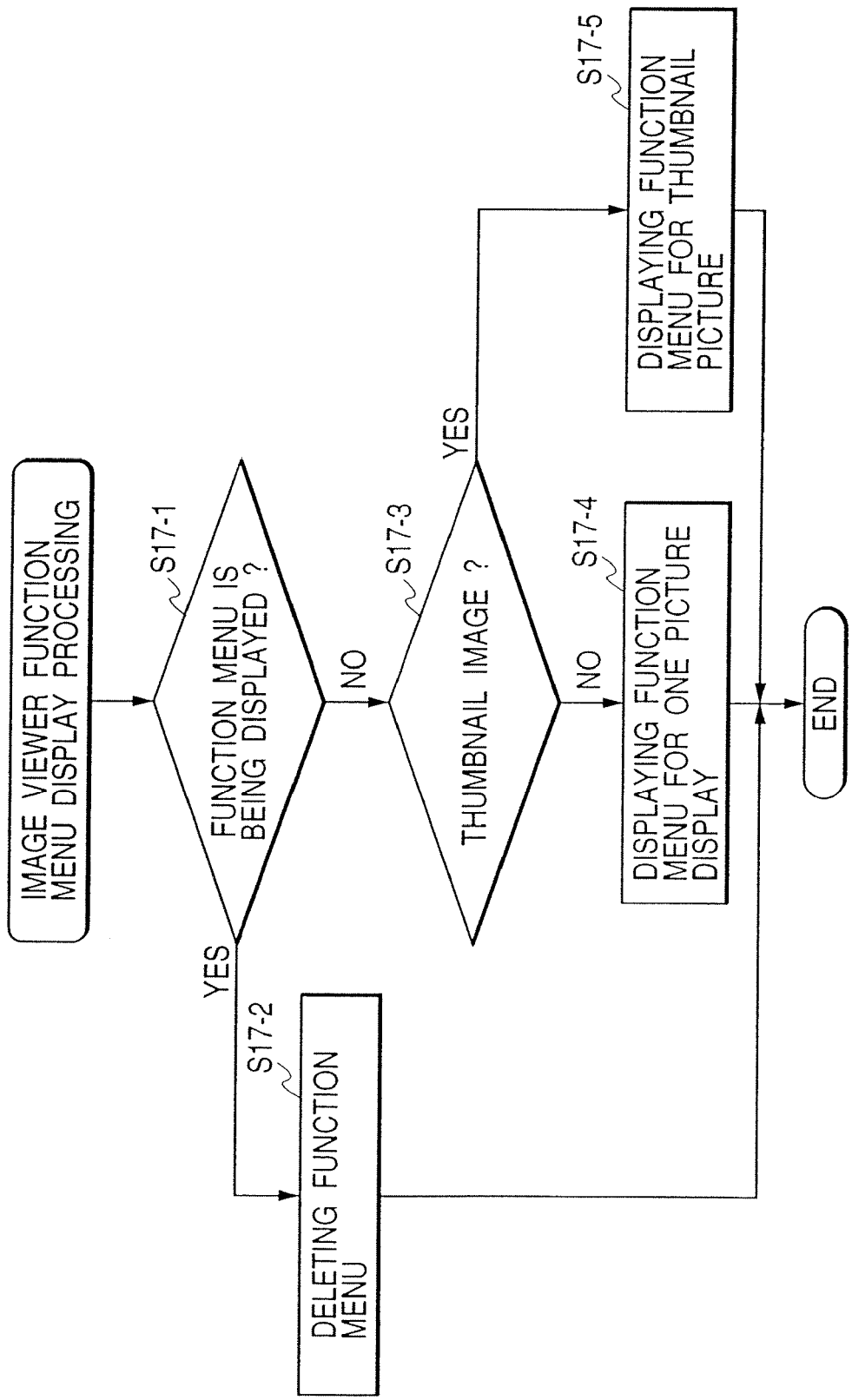
FIG. 17 is a flowchart showing the function menu display processing performed by the image viewer application.

FIG. 17 is a flowchart showing the functional menu display processing performed when the image viewer application is executed.

As is shown in FIG. 17, the function menu displayed using the function key 204, i.e., functions corresponding to the color keys, are so allocated that they differ depending on the state of the image viewer application (S17-3, S17-4 and S17-5). At step S17-1, a check is performed to determine whether the function menu is currently displayed. If the function menu is currently displayed, at step 17-2, the function menu is erased. If the function menu is not currently displayed, at step S17-3, a check is performed to determine whether a thumbnail image is currently displayed. If a thumbnail image is currently displayed, at step S17-5, the function menu for a thumbnail screen is displayed (see FIG. 7A). If a thumbnail image is not currently displayed, at step S17-4, the function menu for a slide display screen is displayed (see FIG. 16).

Access Number

With the digital television reception apparatus of this embodiment, a number called an access number is displayed beside each reduced image displayed in a matrix, such as is shown in FIG. 6A. When the user enters a numerical key corresponding to a desired image and depresses the decision key, the selected image is enlarged and displayed as is shown in FIG. 6B (S5-16 and S5-18).

Registration to Up/Down List

The Up/Down list registration process will now be described. The Up/Down list indicates the screen that is to be displayed next when the user manipulates the Up or Down button 208 on the remote controller 116, and is prepared in memory by the GUI software when the digital television reception apparatus 100 is activated (the processing is not shown).

FIGS. 10A to 10C are diagrams showing the contents of the Up/Down list. Immediately after the digital television reception apparatus 100 is powered on, available television channels in FIG. 10A are registered in the list. Then, when the user depresses the Up/Down button 208 while watching the television, the channels are switched by the GUI software in accordance with this list. A function for calling the GUI software is registered in the "resume" entry. For example, when the Up key is depressed while VHF1 is displayed, function FullTV(3) is called, and the display on the screen is changed to VHF3. Thereafter, each time the Up key is depressed, the channel is changed in the order from VHF4 to . . . to BS5 to VHF1. When the Down key is continuously depressed, the channel is changed in the order from VHF1 to BS5 . . . to VHF 3 to VHF1.

When, while watching the television, the user depresses the menu key and by moving the cursor initiates the execution of the image viewer, the process at step S5-1 in FIG. 5 is begun, and the information on the image viewer is registered on the list, as is shown in FIG. 10B. The function that should be called by the GUI software when the application is to be displayed again is registered as the "resume" entry on the list.

Operation Associated with Up/Down Key

When, for example, the Up key is depressed while BS5 is displayed on the television, function Viewer_wakeup( ) is called in accordance with the list in FIG. 10B. This function corresponds to step S5-20 in FIG. 5.

Further, when the Up/Down key is manipulated while the image viewer screen in FIG. 6A or 6B is displayed (S5-7 in FIG. 5), the screen is changed in accordance with the Up/Down lists in FIGS. 10A to 10C (S5-8). When an instruction to display the image viewer is entered again, program control advances to step S5-17, and the thumbnail image of the image viewer is displayed (S5-20).

Deletion of Registration on Up/Down List

Figure 9:
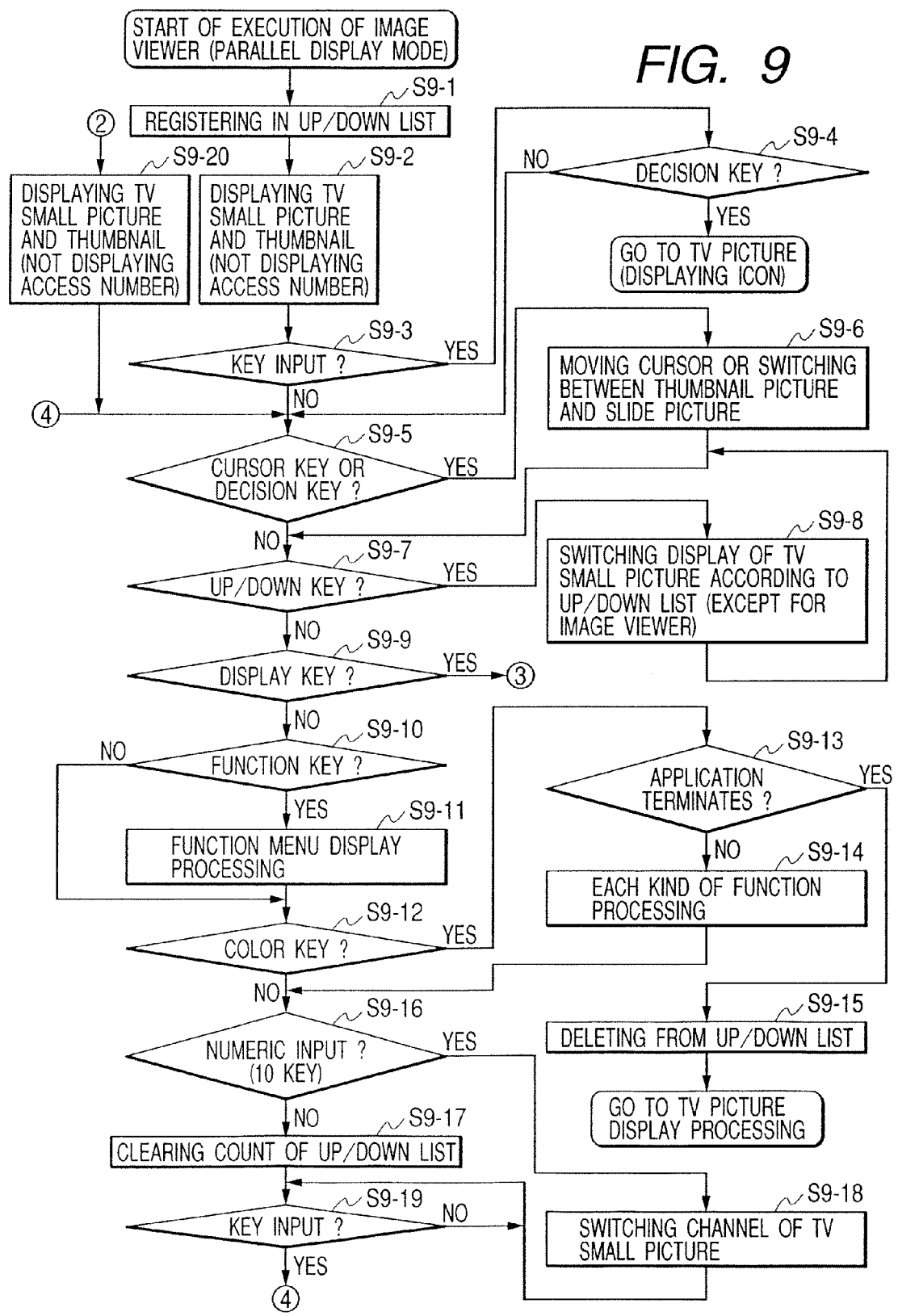
FIG. 9 is a flowchart showing the processing performed in the simultaneous display mode of the image viewer application.

When the user depresses the function key 204 while operating the image viewer, and selects the termination of an application, the information on the image viewer is deleted from the Up/Down list at step S5-13 in FIG. 5 or at step S9-13 in FIG. 9.

Further, the numbers in the "Time" entries in FIGS. 10A to 10C represent the time that must pass before a registered application, such as the image viewer, is automatically deleted. In this case, it is indicated that the application is to be deleted after 25 minutes have passed.

Figure 11:
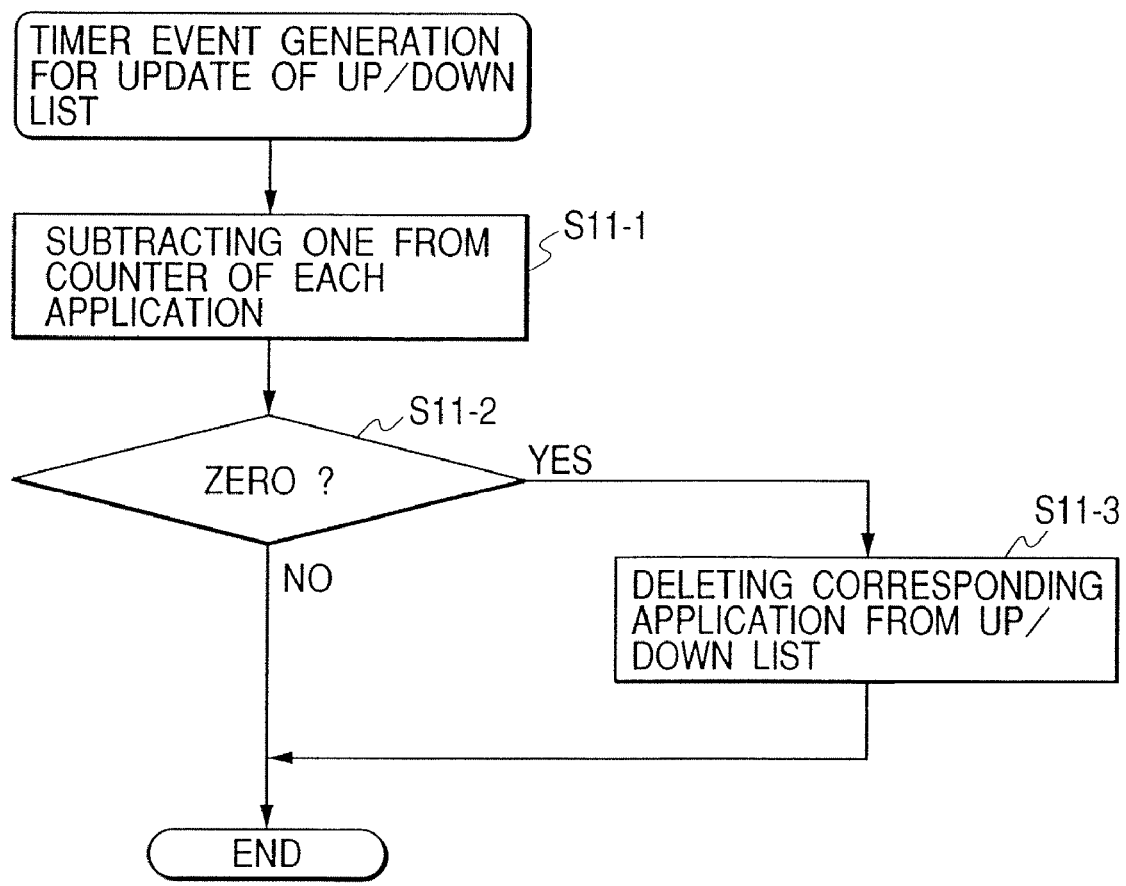
FIG. 11 is a flowchart showing the Up/Down list updating process initiated upon the occurrence of an Up/Down list updating timer event.

FIG. 11 is a flowchart showing the Up/Down list updating processing that is periodically performed. In this embodiment, the updating process is performed once every minute. During this process, the numerical value recorded in the "Time" entry on the list in FIG. 10A to 10C is decremented by one (S11-1), and when the numerical value reaches 0 (S11-2), the pertinent application is deleted from the list (S11-3). For example, since the numerical value in the "Time" entry for the image viewer in FIG. 10B has reached 0, the image viewer is deleted from the list and the list is shifted to the state shown in FIG. 10A.

The value of the Time entry for each application can be reset when required. But since the value for the Time entry is set to an initial value (e.g., 25) in the main loop of the application (S5-17 in FIG. 5 or S9-17 in FIG. 9), deletion from the list of this Time value using the operation in FIG. 11 is prevented during the execution of an application.

Basic Operation of the Image Viewer in the Simultaneous Display Mode

The operation of the image viewer in the simultaneous display mode in FIG. 9 will now be described.

As will be described later, when the digital television reception apparatus is powered on and the memory card is inserted, or when the memory card is inserted and the image viewer icon is selected, the process at S9-1 is initiated. When, as is described above, the display key is depressed in the single mode of the image viewer (S5-9), the display shown in FIG. 8A, wherein a small television screen and a thumbnail image are multiplexed, is presented (S9-20), and program control is shifted to S9-5. In this case, it is designed that, an access number is not displayed.

First, a series of information entries for activating the image viewer is registered on the Up/Down list (S9-1), and the television screen and the thumbnail images shown in FIG. 8A are displayed at the same time (S9-2). It should be noted that an access number is not displayed at this time. When the image viewer is activated and the decision key is first depressed (S9-4), the screen is returned to a display shown in FIG. 13, wherein icons are multiplexed on the television screen.

When in the state in FIG. 8A the user moves the cursor, either one of images displayed in a matrix or the television screen 801 is highlighted and can be selected using the cursor key. When the decision key is depressed, the selected image is enlarged and displayed, as is shown in FIG. 8B (S5-9 and S9-6). While when the small television screen 801 is selected using the cursor key and the decision key is depressed, the display is changed to the television screen (FIG. 13) whereon icons are multiplexed. And when in the state in FIG. 8B the user again depresses the decision key, the display is returned to the screen in FIG. 8A.

When the Up/Down key is depressed in the state in FIG. 8A or 8B, the small television screen 801 is changed in accordance with the Up/Down list (S9-7 and S9-8). At this time, the image for the image viewer is not displayed in the small television screen 801, i.e., operations other than the image viewer registered on the Up/Down list are executed and are displayed on the small television screen 801.

When the display key 205 on the remote controller 116 is depressed in the state in FIGS. 8A or 8B, the screen shown in FIGS. 6A or 6B in the image viewer application single mode is displayed (S9-6 and S5-17 in FIG. 5).

When the function key 204 is depressed in the state in FIG. 8A or 8B, the same process is performed as in the single mode, and no further explanation for it will be given. The small television screen 801 is always displayed in the simultaneous display mode, and differs from the display screen in the single mode.

The processing performed by manipulating the keys in the ten key pad 210 will now be explained. As is described above, when in the simultaneous display mode, as well as in the single mode, a thumbnail image is selected by using the cursor key 203 and the decision key is depressed, the image is fully enlarged and displayed. In the simultaneous display mode, the access number is not displayed as is shown in FIG. 8A (S9-2 and S9-20), and an image is not displayed, even when the user manipulates the numerical keys on the remote controller 116. Instead, by pressing a numerical key a television channel screen can be selected (S9-16).

Since the process for a registration on the Up/Down list and the deletion of a registration are the same as those in the single mode, no explanation for them will be given.

Operation When a User Inserts a Card While Watching Television

The operation performed when the user inserts a memory card while watching a television program in FIG. 4A.

Figure 12:
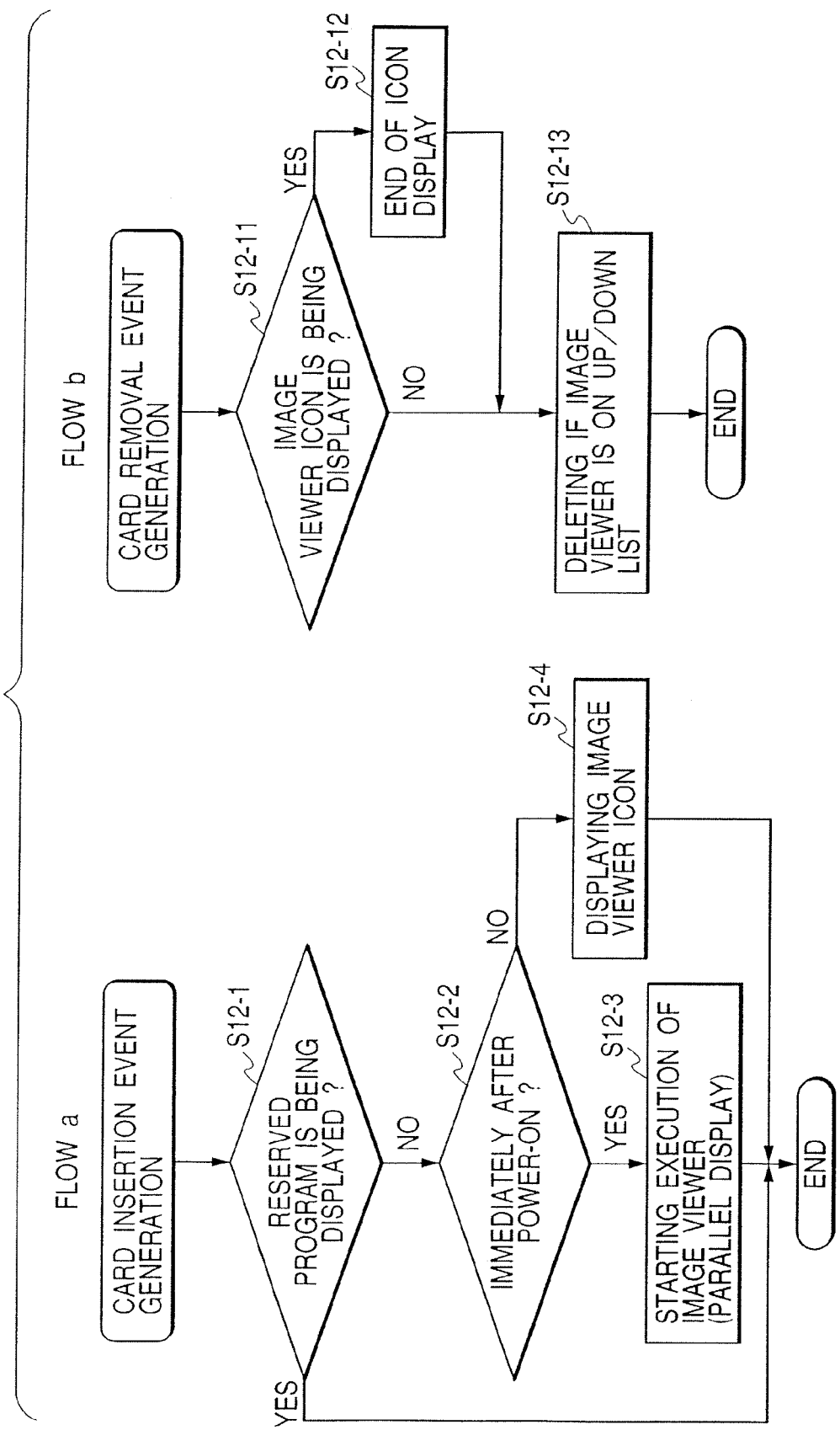
FIG. 12 is a flowchart showing the processing performed when a memory card is inserted and the processing performed when the memory card is removed.

FIG. 12A is a flowchart showing the processing performed by the GUI software upon the insertion of a memory card. When a user inserts a memory card while watching television, a card insertion event occurs. During the process performed for the event, a check is performed to determine whether the currently displayed program is the one reserved by the user (S12-1). When the currently displayed television program is not the one reserved, the time that has elapsed since the digital television reception apparatus 100 was powered on is read. When the elapsed time is equal to or smaller than a specific value, i.e., the elapsed time since the apparatus was powered on does not exceed a predetermined time (S12-2), the process in FIG. 9 is immediately initiated, beginning at step S9-1, in the simultaneous display mode (S12-3). Then, the display is shifted to the matrix display screen in FIG. 8A.

Figure 13A:
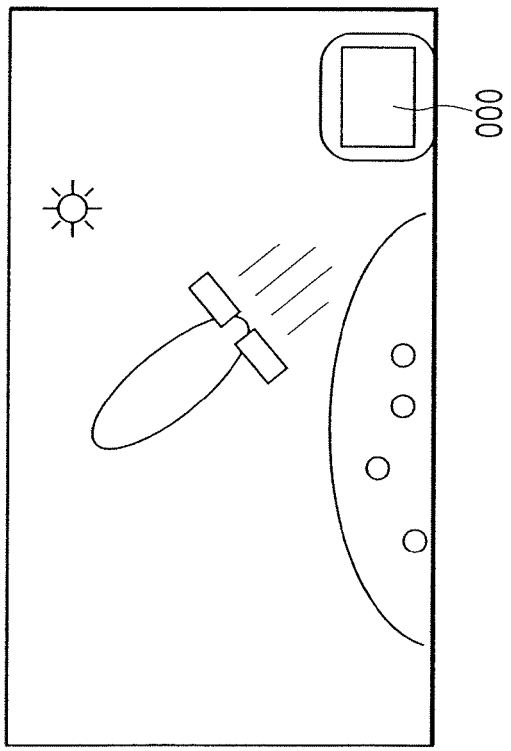
FIGS. 13A and 13B are diagrams showing the state wherein an image viewer icon is displayed on a television screen.
Figure 13B:
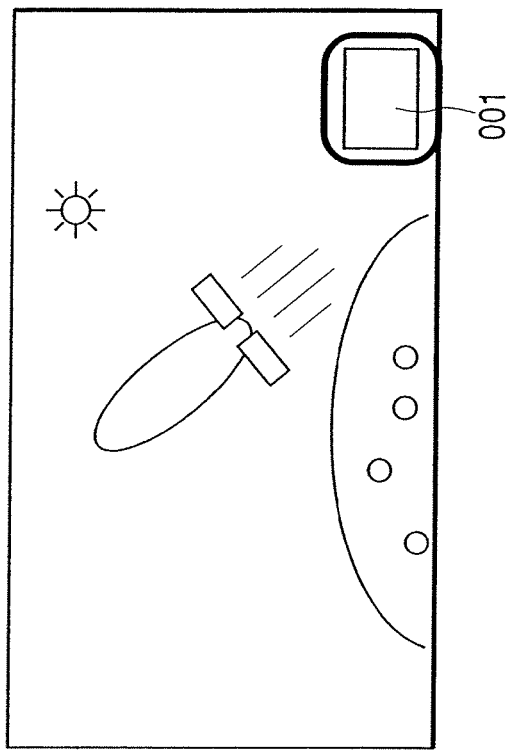

When the elapsed time exceeds the predetermined time, icons are displayed in one part of the screen as is shown in FIG. 13A (000). In this state, when the user moves the cursor in either direction, the icon is highlighted as is shown in FIG. 13B (001).

FIG. 14 is a flowchart showing the processing performed when an image viewer icon is displayed. Immediately after the icon is displayed, the first image stored on the memory card is displayed in a reduced size in the window 000 (S14-1). Then, when the icon is selected using the cursor and is highlighted (S14-2), thumbnail animation is initiated, and image data are sequentially read from the memory card at each predetermined time interval and are displayed in a reduced size one image by one image (S14-3).

When in this state the user depresses the decision key (S14-5), the image viewer in FIG. 8A is displayed at the same time. But if the decision key is not depressed within a predetermined period of time, the icon is erased (S14-6 and S14-7).

When, as is described above, the icon is displayed while the user is watching television and is selected using the cursor key 203 and the decision key is depressed, the process at S9-1 in FIG. 9 is begun, and the display is shifted to the application screen in FIG. 8A. In the initial state, on the application screen no image is highlighted, and when in this state the decision key is again depressed, the display is returned to the television screen in FIG. 13B where the icon is displayed (S9-4 in FIG. 9).

Processing Upon Removal of Memory Card

FIG. 12B is a flowchart showing the processing performed by the GUI software when the memory card is removed while the user is watching television. When the memory card is removed, a card removal event occurs. During the processing performed for this event, when the icon of the image viewer is currently displayed, that display is ended (S12-12). And if the image viewer is registered on the Up/Down list, it is deleted (S12-13).

Current Content Display

An explanation will now be given for the processing performed when the user depresses the menu key 207 and the menu in FIG. 4B is displayed while the image viewer is registered on the Up/Down list, and when the user selects the program guide and then current content, as is shown in FIG. 4C.

Figure 15A:
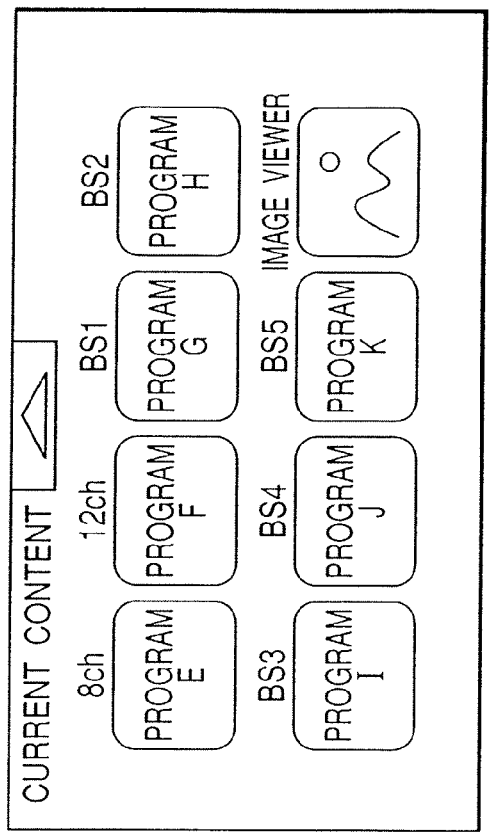
FIGS. 15A and 15B are diagrams showing example current content screen displays.
Figure 15B:
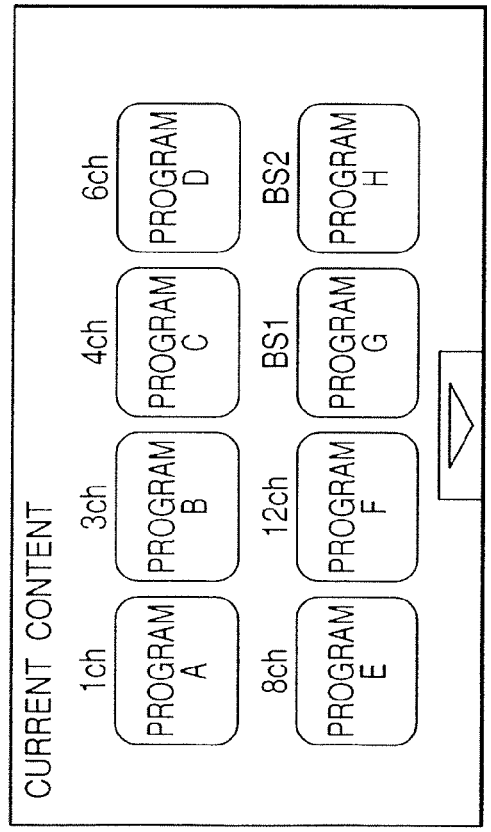

FIG. 15A is a diagram showing the initial state of the current content display screen. FIG. 15B is a diagram showing the state wherein the user scrolls the screen by moving the cursor downward. Although not described in detail, based on the program guide information that is obtained through the demultiplexer 103 and the data streamer processing unit 106, the titles, the contents and the casts of the programs that are currently being broadcast are displayed in the windows for programs A to K. When image data is included in the obtained program guide information, an image may also be displayed. The GUI software arranges and displays the programs in the order they are arranged on the Up/Down list.

When the image viewer is registered on the Up/Down list, the image viewer icon is displayed on the current content display screen, and when in accordance with the process in FIG. 14 the image viewer icon is selected using the cursor, thumbnail animation is initiated, and image data are sequentially read from the memory card at a predetermined time and are displayed in a reduced size one image by one image (S14-3).

In the embodiment, two keys, the Up and Down keys, are provided on the remote controller 116 in FIG. 2, and the data used to determine the order in which to switch displays is called the Up/down list. However, only one key, such as a "display forward" key, may be provided.

In addition, in the embodiment, the image viewer is employed as an example application that is registered on the Up/Down list and involved in the display change cycle of the Up/Down key. However, a browser application shown in FIG. 10C can be registered, and can be involved in the display change cycle of the Up/Down key during the execution of an application and for a predetermined period of time.

As is described in detail, according to the television signal reception apparatus of this embodiment, a user interface is improved for a television signal reception apparatus that has not only a reproduction function for television programs, but that also has various other functions, such as a multimedia function, so that a user can simply and easily select and control desired information. Further, in this embodiment, a problem that occurs when a television signal reception apparatus is operating an application, and a new problem that occurs because while watching television a user can easily change to and use an application are also resolved.

For example, according to the television signal reception apparatus in this embodiment, while watching television a user can switch to the use of an application merely by manipulating the Up/Down key, and only a very simple operation, similar to changing channels, is required to operate functions provided for a multifunctional television reception apparatus. Further, in this embodiment, not all the applications are registered on the list for the Up/Down key; instead, only those applications that is determined to be active are registered. Therefore, the display is not changed to a screen for an application that a user does not intend to use, and the user can obtain a desired program or application, even in an environment wherein many applications are available for use. Furthermore, since an application that is not employed by a user is automatically removed from the list, the above described advantage can be maintained when the user employs the reception apparatus for a long time.

Further, in this embodiment, a currently employed application is displayed on a screen on which not only the Up/Down key list but also a list of the programs currently being broadcast is displayed. Thus, while watching a single screen, the user can decide whether to spend the remaining period of time watching television or using an application.

According to a television signal reception apparatus in the embodiment, since an image display application can be automatically executed merely by inserting a memory card, the operations required of a user for monitoring, on the screen of a television receiver, an image obtained with a digital camera can be reduced dramatically.

In addition, an icon is displayed only once, for a predetermined period of time, while a user is watching television, and at this time the user can decide whether or not to initiate an image display application. Therefore, the operation of an apparatus can be simplified while avoiding the problem that arises because the automatic switching of a screen can irritate a user who is watching a television program. Further, when the execution of an application is selected, the program that the user was watching is displayed in a small window on the screen, so that the display of the program is not completely halted.

Further, since the display of an icon for a program that was reserved in advance is automatically halted, the user can concentrate on watching of the program, not the icon.

Moreover, in this embodiment, the contents of a memory card are briefly displayed during the time the icon is displayed, so that the user can confirm the contents of the memory card without switching screens.

In addition, according to the television signal reception apparatus in this embodiment, when one of the numbers positioned beside each sample (thumbnail) image in a full screen display for an application that is being executed is entered using the remote controller, the desired image can be easily selected and magnified without moving the cursor. Further, in this embodiment, when the display for an application is accompanied by the display of a small television screen, the entry of a number is used to instruct a television channel change. At this time, when the display of the numbers beside the images is halted, a user can be prevented from becoming confused.

Furthermore, according to the television signal reception apparatus in this embodiment, on a display for an application a function menu is provided that uses using the same arrangement as that employed for the color keys on the remote controller, and the available functions can be controlled and employed by depressing corresponding color buttons. Thus, various processes can be performed without moving the cursor, and the operation of the application is simplified.

The objective of the invention can also be achieved by supplying to a system, or an apparatus (or a CPU or an MPU), software program code that implements the functions of the embodiment, and by permitting the system or the apparatus to execute the program code.

In this case, invention functions are provided by the software program code, and the storage medium on which the program code is recorded constitutes the present invention. The storage medium for supplying the program code can be, for example, a floppy disk, a hard disk, an optical disk, a magneto-optical disk, a CD-ROM, a magnetic tape, a nonvolatile memory card, or a ROM.

This embodiment is employed merely to provide an example implementation of the present invention; the technical scope of the invention is not limited to this embodiment. That is, the present invention can be variously modified without departing from the primary features of the invention.

As is described above, according to the present invention, an improved user interface is provided for a television signal reception apparatus that includes not only a television program reproduction function, but also various other functions, such as a multimedia function, and the user can simply and easily select desired information.

What is claimed is:

1. A broadcast reception apparatus comprising:
reception means for receiving a program that is broadcast;
external storage medium connection means for connecting a storage medium on which a plurality of image data are stored;
operation input means for receiving an operation instruction from user input means that includes an image selection button and color buttons of at least two colors;
display control means for displaying, on display means, an image related to a broadcast program received by said reception means and an image related to image data read from said external storage medium; and
control means for controlling said display control means so as to display a list of image data stored in said external storage medium, and display, on a portion of a screen, icons having the same color arrangement as the color buttons on said user input means and delineating different functions, and for executing a function represented by an icon having the same color as the color button that is entered using said user input means,
wherein when an image on the list is selected by the manipulation of the image selection button on said user input means, said display control means enlarges and displays on the screen only the selected image, and changes the functions delineated on the icons.

2. A broadcast reception method comprising:
a reception step of receiving a program that is broadcast;
an external storage medium connection step of connecting a storage medium on which a plurality of image data are stored;
an operation input step of receiving an operation instruction from user input means that includes an image selection button and color buttons of at least two colors;
a display control step of displaying, on display means, an image related to a broadcast program received in said reception step and an image related to image data read from said external storage medium; and
a control step of controlling said display control step so as to display a list of image data stored in said external storage medium, and display, on a portion of a screen, icons having the same color arrangement as the color buttons on said user input means and delineating different functions, and of executing a function represented by an icon having the same color as the color button that is entered using said user input means,
wherein when an image on the list is selected by the manipulation of the image selection button on said user input means, said display control step enlarges and displays on the screen only the selected image, and changes the functions delineated on said icons.

* * * * *

UNITED STATES PATENT AND TRADEMARK OFFICE
CERTIFICATE OF CORRECTION

PATENT NO. : 7,287,266 B2
APPLICATION NO. : 11/424416
DATED : October 23, 2007
INVENTOR(S) : Shuntaro Aratani et al.

It is certified that error appears in the above-identified patent and that said Letters Patent is hereby corrected as shown below:

COLUMN 2
Line 12, "proposal" should read --a proposal--.

COLUMN 3
Line 9, "CPU." should read --CPU;--.
Line 45, "embodiment." should read --embodiment;--.

COLUMN 4
Line 8, "descrambler." should read --the descrambler.--.

COLUMN 6
Line 65, "selects" should read --select--.

COLUMN 7
Line 20, "which" should read --while--.

Signed and Sealed this

Third Day of March, 2009

JOHN DOLL
*Acting Director of the United States Patent and Trademark Office*